United States Patent
Zawadzki et al.

(10) Patent No.: US 10,700,930 B1
(45) Date of Patent: *Jun. 30, 2020

(54) NETWORK DESIGN OPTIMIZATION

(71) Applicant: Facebook, Inc., Menlo Park, CA (US)

(72) Inventors: Erik Zawadzki, Palo Alto, CA (US); Birce Tezel, Redwood City, CA (US); John Martin, Mountain View, CA (US); Paul Parayil Varkey, Campbell, CA (US); Vincent Gonguet, San Francisco, CA (US); Joseph Warren Button, San Bruno, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/774,097

(22) Filed: Jan. 28, 2020

Related U.S. Application Data

(63) Continuation of application No. 16/528,276, filed on Jul. 31, 2019, now Pat. No. 10,623,256, which is a continuation-in-part of application No. 16/122,837, filed on Sep. 5, 2018, now Pat. No. 10,425,832.

(60) Provisional application No. 62/699,597, filed on Jul. 17, 2018.

(51) Int. Cl.
*H04W 16/18* (2009.01)
*H04L 12/24* (2006.01)
*H04W 84/18* (2009.01)
*H04L 12/26* (2006.01)
*H04W 24/02* (2009.01)

(52) U.S. Cl.
CPC ...... *H04L 41/0823* (2013.01); *H04L 41/0609* (2013.01); *H04L 41/082* (2013.01); *H04L 41/12* (2013.01); *H04L 41/145* (2013.01); *H04L 41/20* (2013.01); *H04L 41/22* (2013.01); *H04L 41/5025* (2013.01); *H04L 41/5067* (2013.01); *H04L 43/04* (2013.01); *H04L 43/0817* (2013.01); *H04L 43/0876* (2013.01)

(58) Field of Classification Search
CPC ........ H04W 16/18; H04W 84/18; H04L 41/12
See application file for complete search history.

(56) References Cited

U.S. PATENT DOCUMENTS

| 7,929,459 B2 | 4/2011 | Silva et al. |
| 2002/0068612 A1 | 6/2002 | Carey et al. |
| 2003/0174671 A1 | 9/2003 | Chen |
| 2006/0142004 A1* | 6/2006 | He ........................ H04W 48/16 455/434 |

(Continued)

*Primary Examiner* — Joshua L Schwartz
(74) *Attorney, Agent, or Firm* — Brian R. Short

(57) ABSTRACT

In one embodiment, a computing system may identify, in a geographic region, a number of sites satisfying one or more criteria based at least on geographic data accessed from one or more data sources. The system may generate, for the geographic region, a number of communication network graphs each satisfying one or more network coverage conditions. Each communication network graph may include a number of nodes corresponding to the sites and a number of edges corresponding to communication network connections between the sites. The system may rank the communication network graphs based on one or more performance parameters. The system may select an optimized communication network graph for the geographic region from the communication network graphs based on their respective rankings.

19 Claims, 10 Drawing Sheets

(56) References Cited

U.S. PATENT DOCUMENTS

2010/0120429 A1     5/2010   Kazmi et al.
2013/0028107 A1     1/2013   Ho et al.
2015/0055497 A1     2/2015   Cheng et al.

\* cited by examiner

| Circle Area Ratio | Number of Sectors | One Sector Omni Antenna | Two Sector 65° Antenna | Two Sector 120° Antenna |
|---|---|---|---|---|
| <0.35 | 2 | ✓ | ✓ | |
| 0.35–0.65 | 1 | ✓ | | ✓ |
| >0.65 | 0 | ✓ | | |

*FIG. 5*

NETWORK DESIGN OPTIMIZATION

PRIORITY

This application is a continuation of U.S. patent application Ser. No. 16/528,276, filed 31 Jul. 2019, which is a continuation-in-part of U.S. patent application Ser. No. 16/122,837, filed 05 Sep. 2018 and Granted as U.S. Pat. No. 10,425,832 on 24 Sep. 2019, which claims the benefit, under 35 U.S.C. § 119(e), of U.S. Provisional Patent Application No. 62/699,597, filed 17 Jul. 2018, each of which is incorporated herein by reference.

TECHNICAL FIELD

This disclosure generally relates to communication networks, and in particular, to designing and optimizing communication networks.

BACKGROUND

Communication networks, such as fiber-optic networks, cellular networks, broadband wireless networks, provide data communication channels for computing systems (e.g., a computer, a tablet, a smartphone) to communicate data and information (e.g., text, images, videos, website content, etc.). A communication network graph may have a number of communication connections connecting a number of nodes (e.g., a house, a building, a town) in the network graph. Each communication connection provides a data transmission capacity between the nodes connected by the communication connection. Each connected node may generate a data flow along the communication connection and create values for both network users and content providers.

SUMMARY OF PARTICULAR EMBODIMENTS

Particular embodiments described here relate to a method for generating and optimizing communication network graphs for a given geographic region of interest to maximize one or more network performance metrics (e.g., the value of connected sites, the number of connected people, the quality of service/experience) and minimize the cost of the connecting network. The communication network may reliably connect the mandatory sites in the geographic region of interest. In other words, the mandatory sites, such as infrastructure in an operator's existing network or other high-value points-of-interest specified by the user, may be reliably connected (e.g., through other routes) by the network under different failure scenarios. Particular embodiments of the system may identify new areas (e.g., using remote sensing or crowd sourced data) in the region of interest (e.g., a rural region) that can be connected profitably by certain network technologies. Particular embodiments of system may generate communication network solutions which may include fiber-optic networks, wireless communication networks (e.g., microwave or millimeter wave ("mmWave") networks), cable networks, or any combination of thereof. The communication network solutions may be at a large scale for a region covering large populations (e.g., a town, a city, a state, or a country).

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 5 illustrates example circle area ratios of different areas for determining wireless antenna arrangements in respective areas.

DESCRIPTION OF EXAMPLE EMBODIMENTS

Figure 1A:
FIGS. 1A-B illustrates an example communication network graph generated for a geographic region of interest.

Fiber Planning
Gathering Data

In particular embodiments, the system may generate an optimized fiber-optic network graph to connect the population of a geographic region with maximized number of connected people or maximized value of connected sites (e.g., maximized profits, maximized revenues), and minimized cost of the network. In particular embodiments, the system may provide an automatic network planning tool for telecommunications network operators. In particular embodiments, the system may gather data related to the geographic region of interest from one or more data sources including, for example, but not limited to, a geographic map repository, a satellite image repository, a road camera image repository, a vehicle camera image repository, a LiDAR data repository, an open-source data source, a data provider, etc. In particular embodiments, the system may use machine-learning (ML) algorithms to process the gathered data and determine a number of parameters related to the region of interest for generating network graphs. For example, the system may use machine-learning algorithms to process high-resolution satellite imagery to detect houses and estimate population in the region of interest. The system may aggregate the detected houses and population density into settlements and generate a high-resolution population density map for the region. The system may use computer vision algorithms (e.g., machine-learning algorithms, artificial intelligence algorithms), mathematical programming techniques (e.g., linear or non-linear integer programs and associated heuristics like sub-gradient optimization or Lagrange relaxation), and/or metaheuristic algorithms (e.g., genetic algorithms, tabu search, simulated annealing, quantum simulated annealing) to identify a number of sites (e.g., buildings, houses, people gathering locations, settlements, microwave aggregation hubs, cell towers, business locations, etc.) that need to be connected by the network along with their associated economic or connectivity values. The identified sites may include a number of mandatory sites that need to be reliably connected under different network failure scenarios. In particular embodiments, the identified sites may include a number of optional sites. In particular embodiments, the system may use exact optimization methods including, for example, but not limited to, linear programming, integer programming, convex optimization methods, gradient descent, sub-gradient descent, Newton and quasi-Newton methods, interior point methods, etc. These methods may find the actual optimal solution if they're applied to the appropriate problems. In particular embodiments, the system may use approximation optimization methods including, for example, but not limited to, Kou's algorithm for Steiner trees, Goeman-Williamson's algorithms for Steiner trees and SNDP, greedy methods for submodular functions, etc. These methods may have a known maximum approximation error which can be used to formally guarantee that the solutions will meet a standard corresponding to the known maximum approximation error. In particular embodiments, the system may use heuristic optimization methods including, for example, but not limited to, topological sorting, heuristic search (e.g., meta-heuristics such as beam search, genetic algorithms, simulated annealing, hill climbing, tabu search, etc.). These methods may have less formal guarantee regarding the quality of solutions than the exact methods or approximation optimization methods. These methods may enable trade-off optimality for computational efficiency based on the experimental/empirical evidence of effectiveness. In particular embodiments, the system may use abstraction optimization method or relaxation optimization method. The generated network graphs may or may not connect the optional sites, but when they do connect the optional sites, the network graphs may also ensure level of service for optional sites.

Determining Properties

In particular embodiments, the system may determine one or more site properties related to the identified sites in the geographic region of interest. The site properties may include, for example, but are not limited to, a population; a population density, a penetration rate, a data consumption metric, a predicted data consumption metric, an estimated revenue, an average revenue per user (ARPU), a shape, a terrain, a terrain roughness, an elevation, an area size, a dimensional metric, a land cover type, a distance to another region, a travel time to major cities, a travel time to existing coverages, a geographic property, a coverage of an existing infrastructure, etc. In particular embodiments, the system may determine and track (e.g., hourly, daily, weekly, monthly, yearly) population movement in the geographic regions of interest at a fine-grained spatial level. In particular embodiments, the system may predict a year-over-year population growth in the geographic regions on interest at a fine-grained spatial level. In particular embodiments, the site properties may be determined based on high-resolution images using machine-learning algorithms. In particular embodiments, the system may generate one or more site value models for the identified sites in the region of interest. The system may determine the value of each site based on the corresponding site value model and site properties.

In particular embodiments, the system may further determine one or more connection properties related to the possible network connections between the identified sites in the region of interest. The connection properties may include, for example, but not limited to, a length, a cost metric, a construction type (e.g., urban or rural), a related terrain, a related existing infrastructure (e.g., a road, a railroad, a pipeline, a cable), a capacity, a reliability metric, a redundancy metric, a soil type, a soil depth, a composition (e.g., lithology/bedrock), a land usage type (e.g., a scrubland, a farm, a city categorization), etc. Then, the system may determine one or more network coverage conditions for an integer linear program to generate network graphs. The network coverage conditions may be determined based at least on one or more of the site properties of the identified sites and the connection properties related to possible communication network connections. In particular embodiments, the system may determine the current data consumption and forecast the future data consumption of the identified sites in the region of interest. The data consumption may be determined using different data sources including, for example, but not limited to, social networks, content providers, carriers, existing sites, etc.

In particular embodiments, the system may generate one or more cost models for the network connections which connect the sites in the region. The system may determine the cost of each network connection based on its corresponding cost model and connection properties. In particular embodiments, the system may use different cost models to handle different types of terrains.

Generating Network Graph

In particular embodiments, the system may determine new nodes for the network graph based on the identified sites to be connected and determine possible connections (i.e., rights of way) between those nodes using fiber-optic links. The connections may be determined using deep learning algorithms based on satellite imagery. Then, the system may generate network graphs by aggregating the new nodes and the connections between them to a geographical map of the region. The network graphs may be generated under a number of network coverage conditions. For example, the network graphs need to reliably connect the mandatory sites in the region of interest. Therefore, the network coverage conditions may include a minimum service level for the connected mandatory sites and the minimum service level is above a pre-determined threshold for different failure scenarios. The network coverage conditions may include a reliability metric and a redundancy metric being above respective thresholds for the connected mandatory sites. In particular embodiments, the system may generate network graphs based on existing infrastructures including, for example, but not limited to, pipelines, cables, towers, poles, fiber cables, fiber ducts, fiber trenches, optical equipment, signal generation equipment, networking equipment, switches, manholes, handholes, etc. In particular embodiments, the system may generate network graphs which include ring-shape networks and have more redundancy than hand-drawn solutions.

Figure 1B:
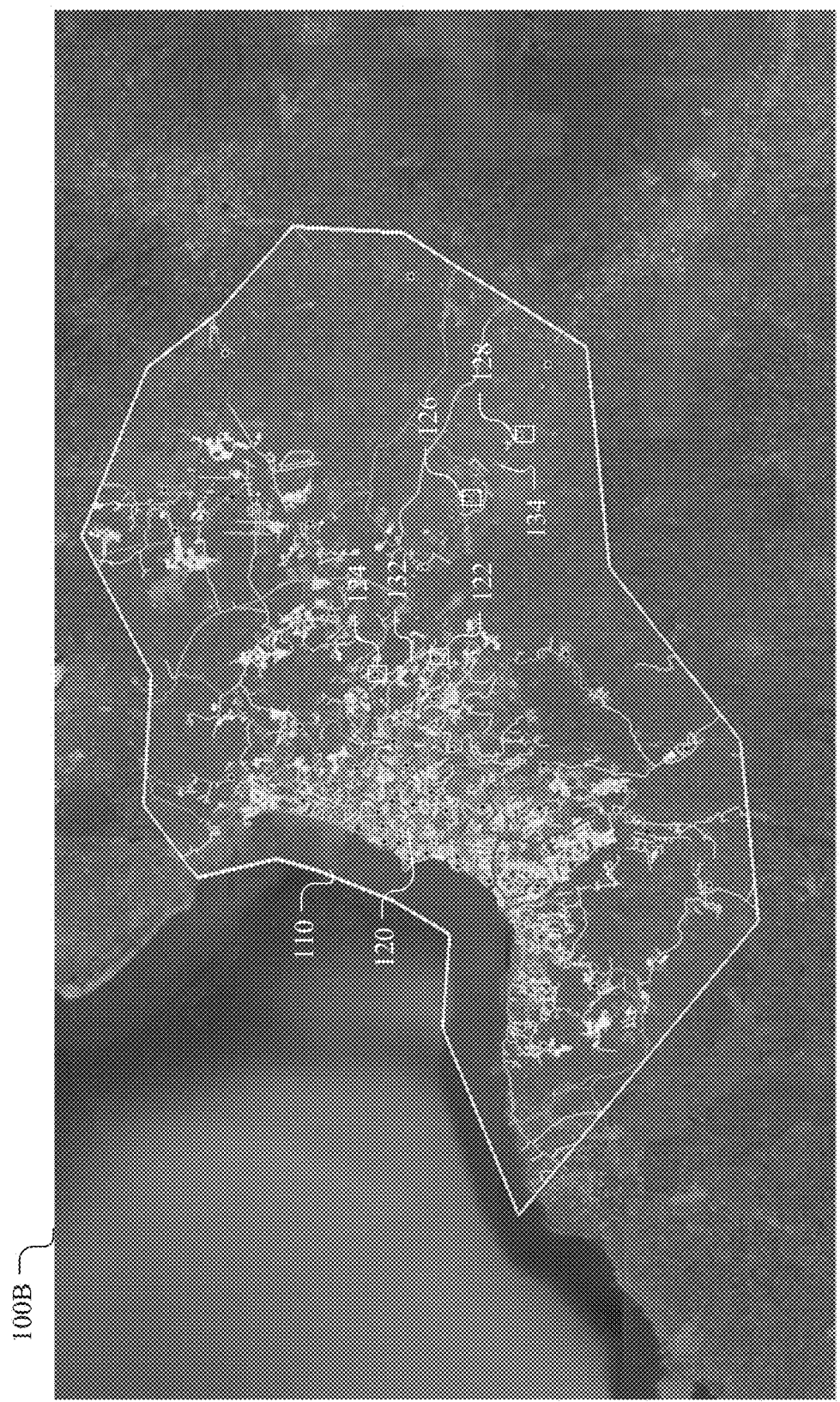

FIGS. 1A-B illustrates an example communication network graph 120 generated for a geographic region of interest 110. During the data gathering stage, the system may receive a high-resolution satellite image 100A or a geographic map including the geomorphic region of interest 110. The system may use computer vision algorithms (e.g., machine-learning algorithms, artificial intelligence algorithms) to identify the mandatory sites (e.g., 122, 124, 126, 128) in the region 110 that need to be connected by the network. After that, the system may generate, for the network graphs, all possible connection routes (e.g., 132, 134 in FIG. 1B) which connect the identified mandatory sites (e.g., 124, 122, 126, 128). Then, the system may stitch the site locations and all possible connection routes into the map of the region 110 and generate the network graph 120 by connecting the mandatory sites with the network connections. The connection routes and connected sites may be marked on the map by lines and site indicators, respectively. The system may prune the network graph to eliminate indirect visual data to enable a clearer visual result and a better performance for the network graph.

Integer Linear Program

In particular embodiments, the system may automatically generate wireless network plans using a survivable network design program (SNDP). In particular embodiments, the SNDP may be an integer linear program (ILP). The system may define a set of parameters for the ILP. The ILP parameters may include, for example, but are not limited to, network graph properties (e.g., node sets, edge sets, edge incident sets, edge capacity), points of interests (e.g., mandatory nodes, optional nodes, source nodes, non-sink nodes), failure parameters (e.g., failure scenarios, probability of each scenario, minimum service level), revenues and cost parameters (e.g., reward for connecting sites, revenue per site per scenario, cost of building a segment of fiber, demand of each mandatory or optional node), variables (e.g., construction decision, flow, connectivity, scenario-level connectivity), etc. The system may further define a set of constraints for the ILP corresponding to different network coverage conditions and optimization requirements. For example, the system may define ILP constraints that require the network to reliably connect all mandatory sites. The reliability of the connections for the mandatory sites may be indicated by a reliability metric which is above a predetermined threshold. With these constraints, the ILP may optimize the network solutions to maximize the revenue (or other parameters like connected population) aggregated over all sites and to minimize the cost of the network.

In particular embodiments, the framework for interdisciplinary design optimization (FiDO) approach may be used for designing and optimizing communication networks for metro (urban) areas. The optimized network solutions may maximize the value of sites or the number of people that can be reliably connected, while minimizing the cost of the connecting network. In particular embodiments, these sites may be a combination of microwave aggregation hubs, cell towers, and business locations. The network may connect the sites using either aerial (e.g., hung from utility poles) or underground fiber. All sites to be connected and all possible ways of connecting these sites may be described in a graph $\mathcal{G} = (\mathcal{N}, \varepsilon)$. Here, N is the node set and $\varepsilon$ is the edge set. The network graph may be required to reliably connect the mandatory sites in the region of interest. The networks that reliably connect the sites may be referred as survivable networks because the networks can survive (e.g., provide connection services to the sites with a minimal level of service, provide connection services a majority of connected sites) even in the presence of failures. The network may ensure to provide the connected sites at least a minimal level of service for these sites (e.g., sites being connected 95% of time, or satisfying some service-level agreement (SLA)). In particular embodiments, the system may incorporate mandatory goals such as connecting a specific site using a specific submarine cable. In particular embodiments, the system may generate the network solutions using a Steiner tree optimization model. In particular embodiments, the level of service provided by the networks may include a number of aspects, for example, decreasing the probability of a total disconnection between two sites and keeping the service from degrading too much when two sites are technically connected. In particular embodiments, the level of service provided by the networks may include requirements and/or constraints on one or more network metric satisfying corresponding network performance thresholds (e.g., percentile of the network latency, percentile of the network capacity).

In particular embodiments, a two-stage stochastic program may be used to generate survivable networks given a set of failure scenarios which may include sets of edges that can jointly fail. The program may find an inexpensive subset $\mathcal{S} \subset \mathcal{G}$ of the graph. For each failure scenario, the program may try to connect the points of interest to a source node which may represent the rest of the network. The program may use objective functions to balance the cost of the edges in $\mathcal{S}$ with the degree of reliability that the edges can provide service. The program may have $\mathcal{O}(|\mathcal{F}| \cdot (|\mathcal{N}| + |\varepsilon|))$ variables, where $\mathcal{F}$ is the set of failure scenarios. The size of graph $\mathcal{G}$ and the number of failure scenarios $\mathcal{F}$ may be any size or number (e.g., hundreds or thousands of nodes, edges and failure scenarios) as long as the program is tractable. The solution may represent which trenches/aerial routes that can be used by network graphs. The solution may also be used for placing equipment, or routing at a cable or fiber level.

In particular embodiments, the system may use a survivable network design program (SNDP) to generate communication network graphs. The survivable network design program (SNDP) may include a survivable network design integer linear program (ILP) as described in the following model:

$$\max_{b,f,x,y} : \sum_{i \in N} \left( v_i y_i + \sum_{s \in F} r_i^{(s)} p_s x_i^{(s)} \right) - \sum_{e \in \varepsilon} c_e b_e$$

s.t.:

$$y_i = 1 \qquad \forall i \in \mathcal{M} \quad [mand.] \quad (1)$$

$$y_i = 0 \qquad i \notin \mathcal{M} \cup \mathcal{P} \quad [\text{non-sink}] \quad (2)$$

$$x_i^{(s)} \leq y_i \qquad \forall i \in \mathcal{N}, \forall s \in F \quad [\text{commit}] \quad (3)$$

$$\sum_{s \in F} p_s x_i^{(s)} \geq q_i y_i \qquad \forall i \in \mathcal{N} \quad [SLA] \quad (4)$$

$$|f_e^{(s)}| \leq (|\mathcal{M}| + |\mathcal{P}|) b_e \qquad \forall s \in \mathcal{F}, \forall e \in s \quad [\text{edge built}] \quad (5)$$

$$|f_e^{(s)}| \leq k_e \qquad \forall s \in \mathcal{F}, \forall e \in s \quad [\text{capacity}] \quad (6)$$

-continued $$f_e^{(s)} = 0 \quad \forall s \in \mathcal{F}, \forall (i, j) \in s \text{ [capacity]} \quad (7)$$

$$d_i x_i^{(s)} + \sum_{e \in N_i} f_e^{(s)} = 0 \quad \forall s \in \mathcal{F}, \forall \mathcal{N} - \{v_0\} \text{ [cons. flow]} \quad (8)$$

$$x_i^{(s)} \in \{0, 1\} \quad \forall s \in \mathcal{F}, \forall i \in \mathcal{N} \quad (9)$$

$$y_i \in \{0, 1\} \quad \forall i \in \mathcal{N} \quad (10)$$

$$f_e^{(s)} \in \mathbb{R} \quad \forall s \in \mathcal{F}, \forall e \in \varepsilon \quad (11)$$

$$b_e \in \{0, 1\} \quad \forall e \in \varepsilon \quad (11)$$

The graph properties used in the model may be described as following: (1) $\mathcal{N}$ is the node set. (2) $\varepsilon \subset \mathcal{N} \times \mathcal{N}$ is the edge set. Only one of (i, j) and (j, i) can be in $\varepsilon$, (i.e. a canonical orientation may be picked for each edge). (3) $\mathcal{N}_i \subset \varepsilon$ is the set of edges incident to i∈N. (4) k∈$\mathbb{R}^{|E|}$ is the capacity along each edge in Gbps, for example. The points of interest used in the model may be described as following: (1) $\mathcal{M} \subseteq \mathcal{N}$ is the set of mandatory nodes which need to be connected with at least a minimal level of service. (2) $\mathcal{P} \subseteq \mathcal{N}$ is the set of optional prize nodes which may be disjoint from the mandatory nodes: $\mathcal{M} \cap \mathcal{P} = \emptyset$. Optional prize nodes may be either connected or not. But if they are connected, the network may still ensure the level of service. (3) $v_0$ is the source node that generates all traffic. Multiple sources can be modeled by hooking each up to $v_0$ with an infinite capacity zero-cost edge that is not in the failure scenarios. These multiple sources may be equivalent in the sense that any of them may be used to satisfy any demands different from a multi-flow program. (4) Anything in $\mathcal{N} - (\mathcal{M} \cup \mathcal{P})$ is a non-sink node, which generates no revenue for being connected.

The failures scenarios may be described as following: (1) $\mathcal{F} \subseteq 2^\varepsilon$ is the set of failure scenarios, each of which is a subset of the edges that simultaneously fail, for example, a scenario set $\mathcal{F} = \{\mathcal{N}\}_{\in \mathcal{N}}$. These scenarios may be outcomes and may be mutually exclusive. To model the independent failure of a number of components, the program may use the power-set of these failures with the appropriate probability weights. (2) p∈$(0,1]^{|\mathcal{F}|}$ s.t.$\Sigma p_i = 1$ is the probability of each scenario. (3) p∈$\mathbb{Z}^{|N|}$ is the minimum service levels (e.g., $q_i = 0.95$ would mean node i must be up 95% of the time). The revenues and cost constants in the model may be described as following: (1) v∈$\mathbb{R}_+^{|N|}$ is the reward for connecting a site and meeting its service-level agreement. (2) r∈$\mathbb{R}_+^{|\mathcal{N}| \times |\mathcal{F}|}$ is the revenue per site per scenario and may be the rewards for making a connected site more reliable. (3) c∈$\mathbb{R}_+^{|\varepsilon|}$ is the cost of building a segment of fiber. (4) d∈$\mathbb{R}_+^{|N|}$ is the demand at each mandatory/prize node (e.g., in Gbps) and has units that match the units for the k.

The variables in the model may be described as following: (1) b is the binary construction decision variable. Fiber may be built along e if, and only if $b_e=1$. (2) f is the flow variable which may be a single type of flow variable. This flow may originate at the root $v_0$ and each committed node (i.e. $y_i=1$) may consume a single unit of flow. Negative flow may indicate flow in the direction opposite to the canonical orientation. (3) y is the connectivity variable. If $y_i$ is equal to 1, then the network may be committed to connect site i with at least some level of service described in $q_i$. (4) x is the scenario-level connectivity variable. $x_i^{(s)}=1$ means that site i was connected to the root in scenario s∈$\mathcal{F}$.

In particular embodiments, the model may include an objective function for a maximize revenue and a minimum cost. Revenue may be aggregated over all sites and scenarios. Revenue may be driven up by connecting more sites ($v_i y_i$), or/and making these connections more reliable ($r_i^{(s)} x_i^{(s)}$). Each edge e has a cost $c_e$, which if a network graph uses, its cost ($c_e b_e$) should be included in the total cost of the network. In particular embodiments, the following constraints may be applied to the model: (1) The network graphs reliably connect all mandatory sites. (Such $y_i$ may be replaced with the constant 1 in the program.) (2) Any site that is not mandatory ($\notin \mathcal{M}$) nor a prize ($\notin \mathcal{P}$) does not count as being reliably connected. (Such $y_i$ may be replaced with the constant 0 in the program.) (3) If the network graph doesn't commit ($y_i = 1$) to connect a site i, the model cannot collect any prizes for it. (4) If the network graph does commit to connect a site, then the network graph needs to guarantee some service-level agreement (SLA). (5) An edge can carry flow, in any scenario, only if it was constructed ($b_e = 1$). (6) Edges are limited in the flow they can carry. (7) If an edge is in the scenario's failure set, it cannot be used to carry flow. (8) Flow must be conserved at every node except for the source $v_0$, which is the only place where flow may be created.

Optimization a. Site Value Model

Figure 2:
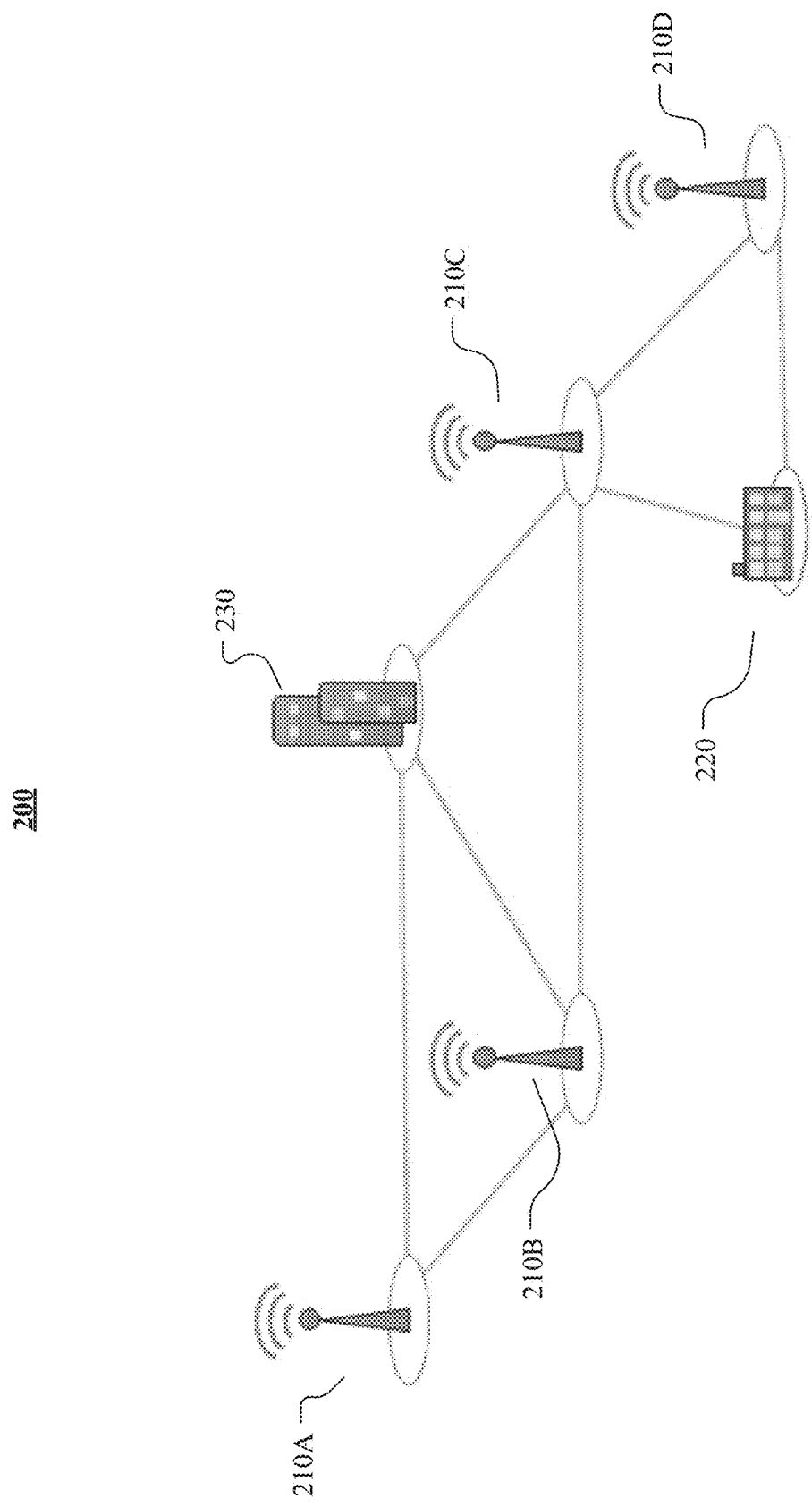
FIG. 2 illustrates a portion of an example communication network graph for determining site values using value models.

FIG. 2 illustrates a portion of an example communication network graph 200 for determining site values using site value models. The network graph 200 may include a number of cellular towers (e.g., 210A, 210B, 210C, 210D) and a number of mandatory sites (e.g., 220, 230) connected by the network graph 200. In particular embodiments, the system may generate one or more site value models for the mandatory or new sites in the region of interest. The site value models may be used to determine the value of a particular site based on the population of the site (e.g., population within 1 km of the site or population within 250 m to 1 km from fiber), the value per user (e.g., average revenue per user per year), the adoption rate (e.g., percentage of population adopting fiber service), and the time horizon (e.g., years of use of fiber network). As an example, the system may determine the value of a site (e.g., buildings 220, 230, towers 210A-D) by multiplying the four parameters of the population, the value per user, the adoption rate, and the time horizon. The model may also incorporate the notion of adult working age and models of busy-hour and contention-ratios, in order to more accurately model demand and adhere to parameters that specify quality of service/experience. The system may use different site value models to handle different types of sites (e.g., building, microwave tower).

For optimizing network graphs, the system may use the site value model with different constraints (e.g., value per user, adoption rate, population, time horizon, etc.) to generate multiple solutions with different costs under different requirement assumptions. The system may generate hundreds of solutions under different assumptions in a short period of time (e.g., 5 minutes) and select the optimized solution according to one or more optimization criteria.

b. Parameter Sweeping

Figure 3A:
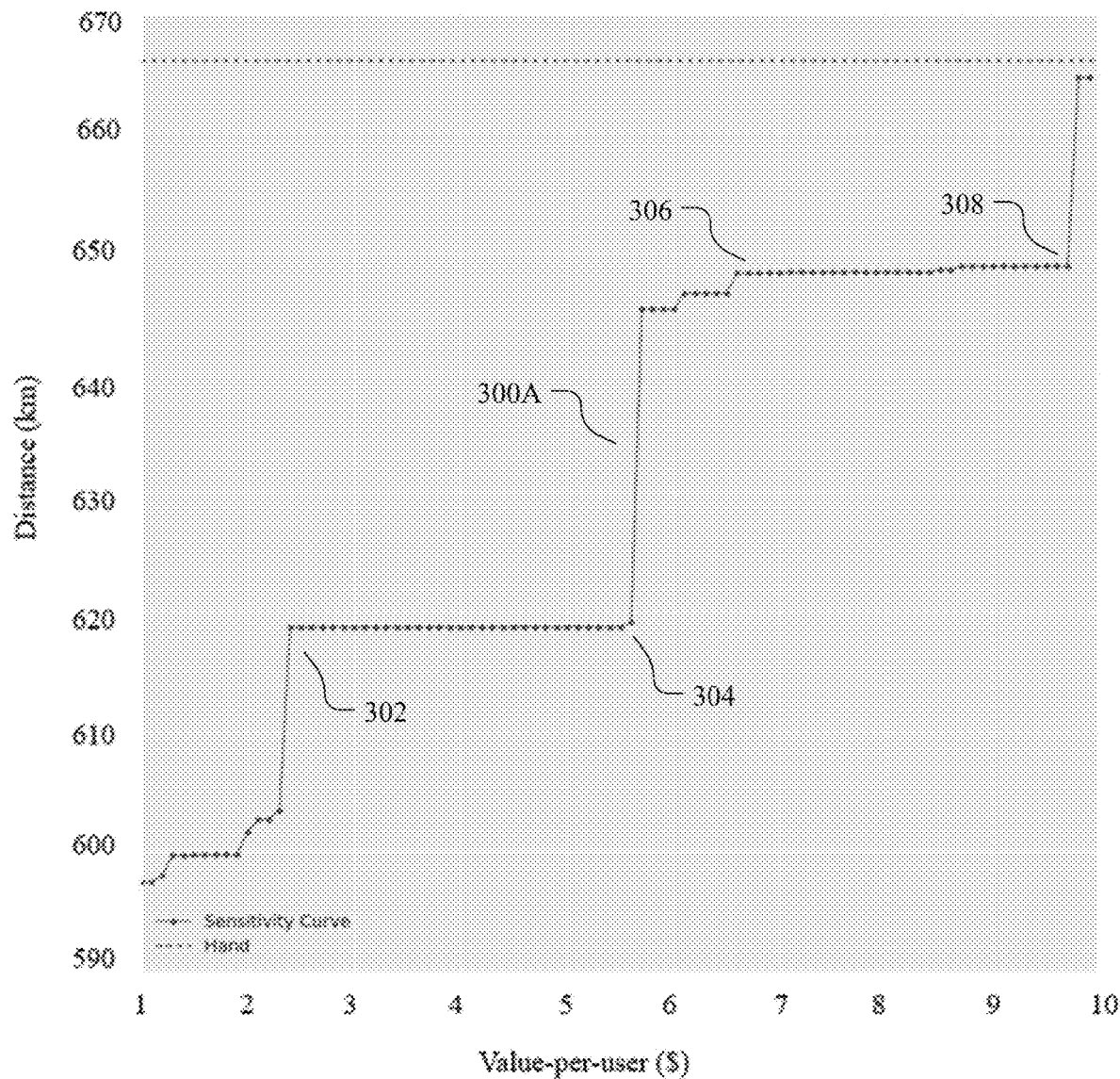
FIG. 3A illustrates an example solution distance curve of communication network solutions under different value-per-user assumptions.

FIG. 3A illustrates an example solution distance curve 300A of communication network solutions under different value-per-user assumptions. For network solutions with the approximately same solution distance, the value-per-user values may vary in a relative large range. For example, the solution distance 619 km may correspond to a value-per-user value of $2.4 at point 302 or a value-per-user value of $5.6 at point 304 depending other conditions of the solutions. As another example, the solution distance 648 km may correspond to a value-per-user value of $6.6 at point 306 or a value-per-user value of $9.7 at point 308 depending other conditions of the solutions. In particular embodiments, the system may determine the optimized solution based on these correlations between the solution distance and the value-per-user. In particular embodiments, the system may, based on the solution distance curves, determine an elasticity metric for the trade-off between multiple objectives that may be in tension. The system may use the solution distance curves (also referred as trade-off curves) to communicate to and help users to understand how to trade off multiple objectives such as costs and coverages. In particular embodiments, the system may use the trade-off curves to understand the uncertainty in network planning. For example, when a parameter (e.g., ARPU) is unknown for a particular region, the system may generate many network solutions by varying this parameter (e.g., ARPU) value across different plausible value ranges. The relationship between this uncertain parameter and other network solution metrics may reveal how sensitive the solutions are to the variance of this parameter. The system may use the trade-off curves to generate suggestions on how time/money should be spent to reduce the uncertainty caused by this parameter. In particular embodiments, the system may use this parameter sweeping method to characterize trade-offs between multiple competing objectives and quantity the sensitivity of the solutions to uncertain parameters. In particular embodiments, the solution distance curves may be related to Pareto frontier or Pareto set. The system may use this parameter sweeping method to determine Pareto efficient solutions which are the solutions cannot be improved for one metric without decreasing another metric.

c. Network Coverage Conditions

In particular embodiments, the system may use the ILP to generate a number of communication network graphs for the geographic region of interest. The network graphs may be generated based at least on the geographic data of the region and one or more network coverage conditions. Each communication network graph may include a number of nodes corresponding to the mandatory sites in the region, and a number of edges corresponding to communication network connections between the mandatory sites. Each communication network graph may satisfy one or more of the network coverage conditions. As an example and not by way of limitation, the ILP may generate communication network graphs based on a network coverage condition including a revenue metric being above a revenue threshold. As another example, the ILP may generate communication network graphs based on a network coverage condition including a cost metric being below a cost threshold. As another example, the ILP may generate communication network graphs based on a network coverage condition including a minimum service level for the connected sites being above a pre-determined service level threshold (e.g., nodes being connected for 95% of the time) under one or more failure scenarios. As another example, the ILP may generate communication network graphs based on network coverage conditions including one or more rule-based constraints for generating the communication network graphs.

Figure 3B:
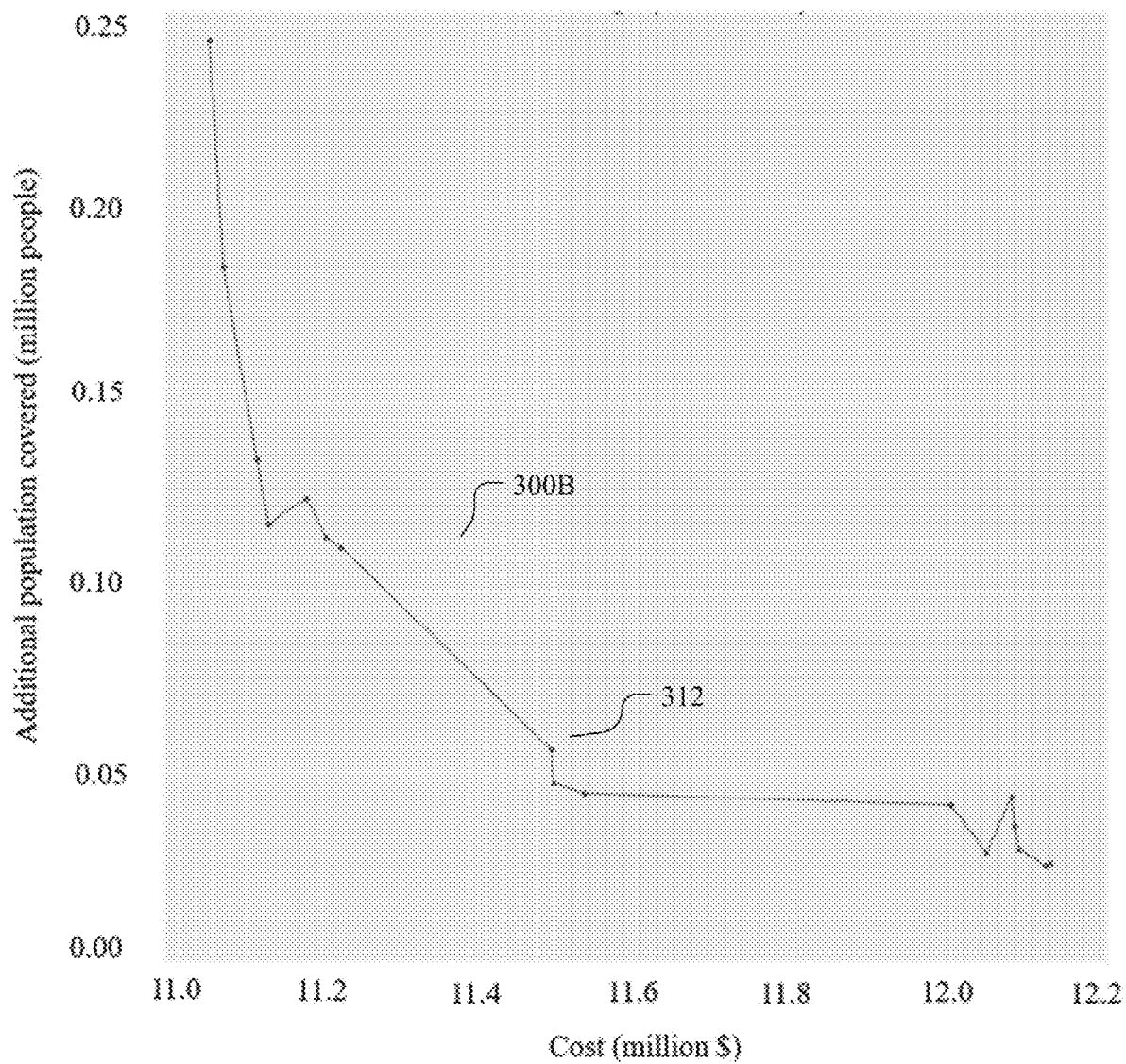
FIG. 3B illustrates an example incremental coverage curve of a network solution.

FIG. 3B illustrates an example incremental coverage curve 300B of a network solution. In particular embodiments, the system may determine incremental cost needed to further cover more population based on a particular solution. For this solution, when the cost is increased to cover more additional population, the same unit of additional cost may cover less additional population when the cost is higher. For example, the cost increase after the point 312 may lead to less increase on the covered population. The network solution may be optimized based on these correlations. For example, the cost may be controlled to be under 11.45 million dollars to maximum the efficacy of unit cost for adding additional covered population.

d. Optimization Criteria

In particular embodiments, the system may rank the generated communication network graphs based on one or more performance parameters associated with the network coverage conditions and select an optimized communication network graph for the region of interest based on their respective rankings according to one or more network coverage conditions. The performance parameters used to rank the network graphs may include, for example, but are not limited to, a covered population, a revenue metric, an overall cost metric, a cost metric per covered person, a cost metric per incremental coverage, a reliability metric, a redundancy metric, a solution distance, a total available market (TAM) metric, a serviceable available market (SAM) metric, etc. The system may select the top-ranking network graph as the optimized network graph according to the parameter that was used for ranking. For example, the system may select a network graph having the maximum estimated revenue as the optimized network graph. As another example, the system may select a network graph having the minimum estimated cost as the optimized network graph. As another example, the system may select a network graph having the highest reliability as the optimized network graph. In particular embodiments, the system may use a linear combination of multiple performance parameters or a weighted combination of multiple performance parameters to rank the generated network graphs. For example, the system may define a profit metric equal to max(revenue−cost+b*reliability), where b is a factor for reliability metric, and the system may use the profit metric to rank and evaluate the generated network graphs.

In particular embodiments, the system may generate communication network solutions based on the network graphs generated by the ILP. The system may analyze and compare the network solutions and identify representative solutions to help in decision making. The system may provide analytics tool for comparing the system-generated network solutions to the hand-drawn solutions by human experts. Table 1 shows three representative solutions comparing to a hand-drawn solution by human experts.

TABLE 1

| Solution Type | Solution Plan | Population covered | Cost | $ per people covered | Distance (km) |
|---|---|---|---|---|---|
| System generated | Low cost/low coverage | 908,136 | $11,057,407 | $12.18 | 597 km |
| System generated | Mid cost/mid coverage | 962,199 | $11,493,114 | $11.94 | 619 km |
| System generated | High cost/high coverage | 997,629 | $12,458,614 | $12.49 | 666 km |
| Hand drawn | Hand drawn from expert | 775,294-888,065 | $11,655,493 | $13.12-$15.03 | 666 km |

As an example and not by way of limitation, the system may select the first network solution in Table 1 as the optimized network solution. The first network solution is a low-cost and low-coverage solution with a total cost of 11,057,407 covering 908,136 population. The total distance of the fiber may be 597 km and the cost per covered user may be $12.18. As another example, the system may select the second network solution in Table 1 as the optimized solutions. The second network solution is a mid-cost and mid-coverage solution with a total cost of 11,493,114 covering 962,199 population. The total distance of the fiber may be 619 km and the cost per covered user may be $11.94. As another example, the system may select the third network solution in Table 1 as the optimized solution. The third network solution is a high-cost and high-coverage solution with a total cost of 12,458,614 covering 977,629 population. The distance of the fiber may be 666 km and the cost per covered user may be $12.49. As another example, the hand-drawn network solution from human mappers may have a total cost of 11,655,493 covering 755,294 to 888,065 population. The total distance of the fiber may be 666 km and the cost per cover user may be $13.12 to $15.03. By comparing the system-generated solutions and the hand-drawn solution, the system may determine the most optimized network solution of the fiber network according to different criteria. For example, the system may identify that the first representative plan is the most economical plan, the second representative plan has the lowest cost per covered user, and the third representative plan has the largest covered population.

e. Comparison with Hand-drawn Solution

Figure 4A:
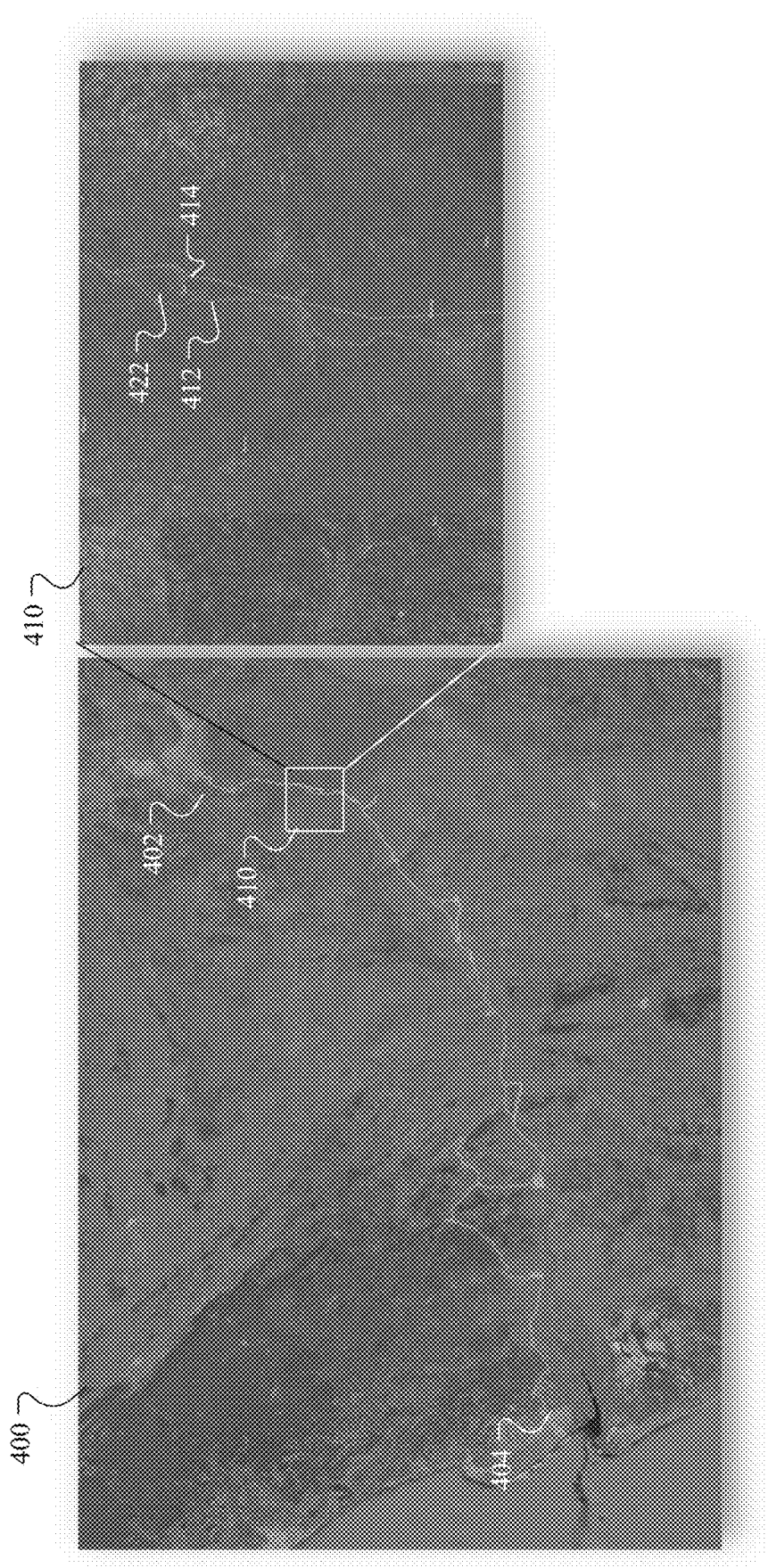
FIG. 4A illustrates an example network graph route comparing with a hand-drawn route of human experts.

FIG. 4A illustrates an example network graph route 412 comparing with a hand-drawn route 414 of human experts. In some situations, the system may pick up some new sites 422 in a sub-region 410 of the region of interest 400 and those new sites are likely be ignored by the human mappers. As an example, when planning a fiber network connecting two major cities 402 and 404, the human mappers may draw the route 414 (e.g., in the sub-region 410) by adopting the route of a pipeline to reduce the network cost. However, instead of adopting the pipeline route, the system may generate the route 412 by routing the fiber to connect some sites (e.g., 422) which have considerable population size but are off the pipeline route. The system may determine that, based on the gathered data in that area, the predicted revenue from these sites may offset the extra cost for the fiber to connect them. In this example, although the system generated plan may have slightly higher overall cost, the plan is optimized to maximize the projected revenue and therefore is more profitable than the human drawn plan.

Figure 4B:
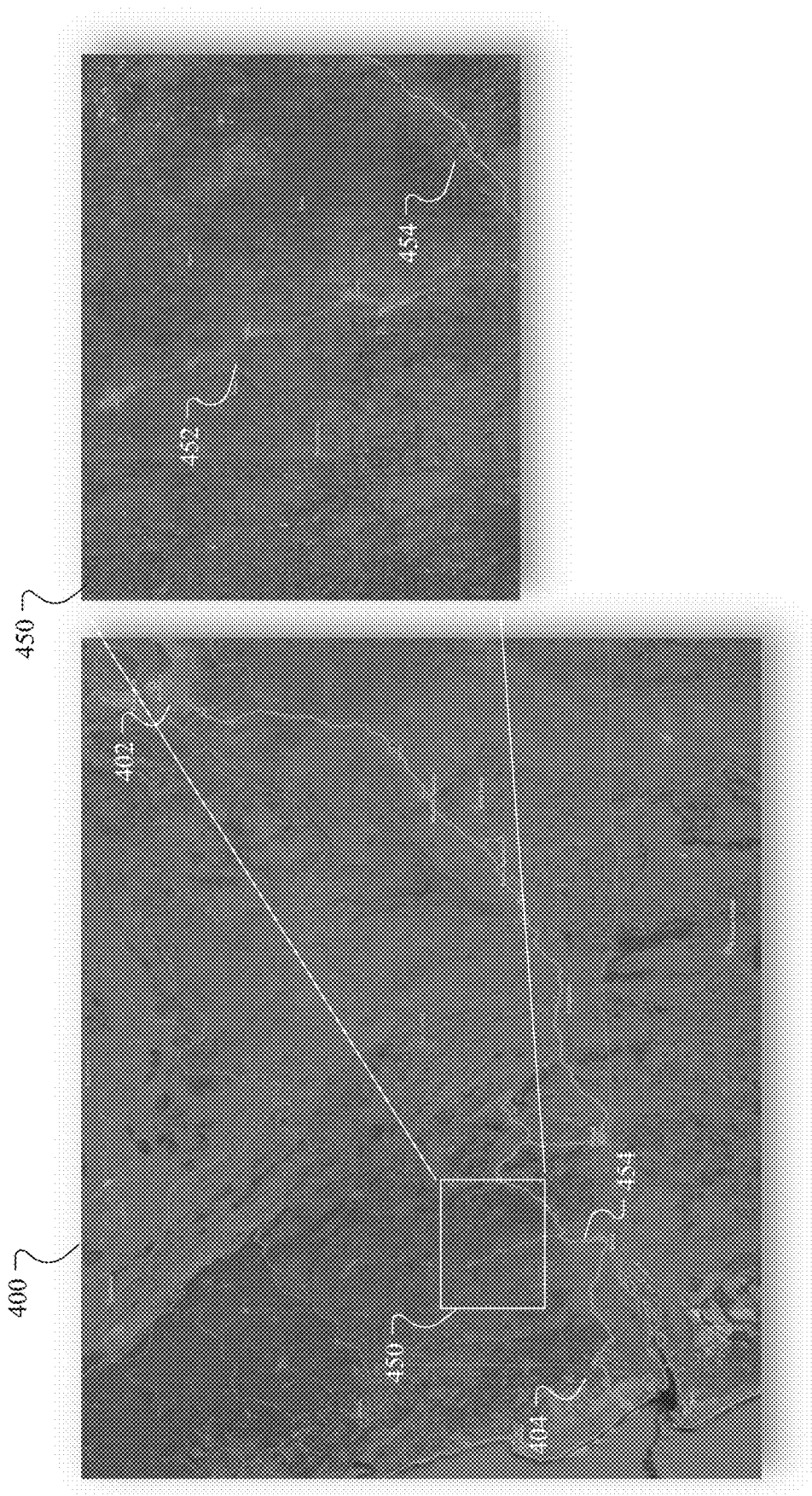
FIG. 4B illustrates an example network graph including a branch that is hard to be discovered by human experts.

FIG. 4B illustrates an example network graph including a branch 452 that is hard to be discovered by human experts. In some situations, the system may generate some branch routes (e.g., 452) for the fiber network which are difficult for human mappers to discover or evaluate the feasibility. The system may identify, using the high-resolution satellite imagery, a series of settlements (in the sub-region 450) which are located relatively far from the main fiber route 454. For human mappers, it is difficult to discover the settlements or evaluate the feasibility of a fiber route connecting these settlements because of the time and information limitations to the human mappers. However, the system may use the gathered data (e.g., road map, satellite images, population density, predicted data consumption, etc.) to design and evaluate the fiber route 452 connecting these settlements very quickly. The system may determine that, although the extra branch route adds extra cost to the network, the cost of this extra branch will be offset by the estimated revenue from it.

Particular embodiments of the system provide many advantages over human mappers and previously existing technologies for communication network planning. For example, the system may use different cost models and site value models to generate and optimize the network solutions and is more powerful and faster than human mappers and previously existing network designing technologies. The system-generated network solutions can be better optimized by using different cost models to handle different types of terrains and using different site value models to handle different types of sites. The system can take into consideration the existing connectivity and infrastructures when developing new network plans and can appropriately handle sites coverage overlapping in the network. The system-generated solutions are more reliable than hand-drawn solutions and have more reporting metrics to optimize the solutions.

Rural Access and Backhaul Planning

Identify Settlements

In particular embodiments, the system may identify areas (e.g., using remote sensing or crowd sourced data) in the region of interest (e.g., a rural region) that can be connected profitably by certain network technologies and generate a communication network graph to connect the identified areas in that region. The system may use computer vision to detect houses using high-resolution satellite imagery of the region and determine the population density of the settlements. The satellite imagery may include both the day-time satellite imagery and night-time satellite imagery. The system may determine spatial clustering of houses and population to identify settlements and create accurate estimation of the total available market (TAM). The system may identify settlements at different scales, for example, a town, a city, an area with multiple towns and cities, a geographic region, or a country. Then, the system may determine a number of parameters related to the identified settlements including, for example, a population, an elevation, terrain roughness, an area size, a land cover (e.g., mixed forests, open lands, plant lands, rivers, mountains), a distance to major roads, a travel time to coverage, a travel time to main cities, a power grid, an estimated penetration, an estimated average revenue per user (ARPU), etc. The system may further determine the derived parameters based on the related parameters and features of the settlements.

Gathering Existing Infrastructure

The system may gather data related to existing connectivity and existing infrastructure precursor to connectivity in the region of interest, for example, but not limited to, coverage of each provider, coverage of each technology, existing fiber networks, existing towers, roads, power lines, cables, pipelines, etc. The system may gather data from different sources including, for example, but not limited to, geographic maps, satellite imagery, road camera imagery, vehicle camera imagery, LiDAR data, open source information, providers, etc.

Cellular Access (RAN) Planning: Location and Configuration Optimization

FIG. 5 illustrates example circle area ratios of different areas for determining wireless antenna arrangements in respective areas. The system may link the identified settlements together to increase the serviceable available market (SAM) and generate the network solution to connect the identified settlements profitably. The network plan for each settlement may be generated based on the properties (e.g., shape and terrain) of that settlement. A circle area ratio may be used to indicate how close the shape of a settlement comparing to a circle. A shape with higher circle area ratio is closer to a circle shape than a shape with lower circle area ratio. The system may determine the number of towers and antenna sectors needed to meet coverage requirement for a given settlement with particular shape and terrain. For example, a settlement with a circle area ratio of less than 0.35 may have a narrow-band shape (e.g., as shown in the top row of FIG. 5) and may need one omni antenna sector or two 65° antenna sectors for a full coverage. As another example, a settlement with a circle area ratio of 0.35-0.65 may have a crescent-shape (e.g., as shown in the middle row of FIG. 5) and may need one omni antenna sector or two 120° antenna sectors to be fully covered. As another example, a settlement with a circle area ratio greater than 0.65 may have a close-circle shape (e.g., as shown in the bottom row of FIG. 5) and need one omni antenna sector to cover it. The system may determine the optimized network solution based on all possible sector arrangements and choose antenna type for the towers accordingly. The system may connect the clustering of settlements (e.g., towns) to aggregate the demand and requirement of each settlement together. The network plan may use a combination of fiber links and microwave towers. For example, fiber may be used to connect major cities and microwave towers may be used to connect small towns extending network from the major cities. In particular embodiments, the system may determine, in a process called brownfield planning, based on modeled new coverage and/or capacity needs, certain existing cell sites for complete or overlay upgrades (e.g., 2G to 4G, increasing the capacity of 3G by sectorization, carrier aggregation, or carrier add). In particular embodiments, the system may also determine, in a process called greenfield planning, based on RF propagation modeling (e.g., empirical ITU models or ray-tracing), population density prediction and connectivity demand growth prediction, zones of no coverage or insufficient capacity that necessitate the building of new sites (e.g., towers) to host RAN equipment. In particular embodiments, these new RAN sites may be optimized with respect to their locations and configurations (e.g., settings for antenna tilt, power, sectors, carriers). This may be done using mathematical programming techniques (e.g., linear or non-linear integer programs and associated heuristics like sub-gradient optimization or Lagrange relaxation) and/or metaheuristic algorithms (e.g., genetic algorithms, tabu search, simulated annealing, quantum simulated annealing). In particular embodiments, these new RAN site locations may be specifically selected to be near road-accessible points, using a determination of the location of roads determined based on crowd-sourced or machine-learning models on satellite imagery. In particular embodiments, these new RAN site locations may be specifically selected to also be near locally high (with respect to elevation) points, in order to maximize the probability that these sites serve a dual-purpose of being transit relay (link) nodes as well, which would increase overall economic optimality of the network design.

RF LOS Modeling

In particular embodiments, the system may evaluate potential Fresnel-clearing line-of-sight (LOS) conditions (e.g., based on elevations and clutter), for any operating frequency and any available choice of backhaul radio, between every site (e.g., fiber, brownfield, otherwise mandatory or new greenfield). The multiplicity of such evaluations may be pre-computed and cached, to enable efficient usage later in the planning workflow. In cases where certain sites do not have LOS back to the core of the network, the system may evaluate the possibility of building many-hop relay paths, by constructing pure relay towers, where each link in the path attains clear LOS. In particular embodiments, the system may optimize the location of the pure relay towers and overall route hop length, in order to meet technical and/or economic constraints. In particular embodiments, the system may again specifically select the pure relay points to be near road-accessible points, using a determination of the location of roads made using crowd-sourced or machine-learning models on satellite imagery.

Microwave (Wireless) Backhaul Planning

Given all possible LOS links from sites back to the core, which imply a multiplicity of routes, the system may perform capacity and flow optimization by statically and optimally selecting routes for each site back to the core of the network, as well as optimally installing link capacities for each link, such that the overall network design is optimized or nearly-optimized with respect to cost and/or coverage/connectivity and/or performance goals. In particular embodiments, the system may model the optimization problem as a linear or non-linear integer program and solve it to optimality or produce nearly-optimal results using heuristics like Lagrangian relaxation or sub-gradient optimization. In particular embodiments, the system may model and solve the problem using sub-optimal but efficient heuristics based on Steiner arborescence solvers and/or metaheuristic algorithms (e.g., genetic algorithms, tabu search, simulated annealing, quantum simulated annealing). In particular embodiments, the capacity of each link may be optimized based on optimal determination of transit flowing through each route in the network. This optimized capacity may be manifested as a selection of equipment (e.g., backhaul radios), its optimal configuration (e.g., selected MCS), power sources (e.g., on-grid or off-grid solar or off-grid diesel), or/and tower heights.

Validating Key Performance Indicators

In particular embodiments, the system may calculate key performance indicators (KPIs) for the generated network solutions to assess the financial viability. The system may estimate a total cost of ownership (TCO) and create demand profile for each network solution. The system may evaluate financial attractiveness of the network solution based on backhaul capital expenditure (CAPEX) and operating expenses (OPEX) per covered city or town. To determine the above parameters with high fidelity, the system may model the impact of equipment, labor (e.g., installation, maintenance), power, rent/lease, spectrum licensing fees, software upgrades and maintenance costs, variable amortization lifetimes, selling, general and administrative expenses (SG&A), taxes, tariffs, depreciation and tax write-offs, deployment and adoption curves, etc. The system may estimate revenue growth based on the CAPEX and OPEX per covered city or town. The system may use the planning tool to accurately determine which backhaul solution is the most cost-efficient solution and estimate the cost for covering the region.

The system may also model revenues/profits using a model of ARPU, growth, and region/country-specific uncertainties. Further, these models may be used to generate economic metrics (e.g., free cash flow, net present value, internal rate of return, EBIT, EBITDA, etc.) to aid decision-makers to prioritize capital investments for communication network builds/upgrades.

Urban Planning

Demand Modeling for Capacity

In particular embodiments, the system may compute expected total feasible consumed bandwidth by region of interest. The system may evaluate expected utilized bandwidth based on historical consumption data, willingness to pay, historical location data, etc. The system may evaluate bandwidth demands for ranking network graphs and link types according to capacity constraints.

Wireless Network Planning

Particular embodiments of the system may generate plans that are robust to network failures by first solving two ILPs consecutively. In the first stage the ILP model minimizes cost, and in the second stage that it maximizes coverage with an expenditure budget under a simulated network failure. Consequently, the resulting network can provide service to a large percentage of the connected sites even in the presence of link/site failures. The sites to be connected may be a combination of microwave aggregation hubs, cell towers, business locations, residences, etc. The system may accelerate deployment and improve reliability of the millimeter wave network ("mmWave network") which can deliver multi-Gbps bandwidth per link.

The system may use LiDAR data and computer vision algorithms to detect poles in the area of interest. The system may also detect attachments to poles and identify traffic lights, utility boxes. The system may use LiDAR to detect the presence of pole armatures, and their extents for radio placement. The system may use detected pole armatures for identifying lines of sight between poles and their armatures or stems. The system may use LiDAR to detect locations on buildings that can connect to the wireless network using lines of sight. A pole classifier may be used to classify different types of poles and distinguish light poles from trees and telephone poles. The system may produce 360° pole images for pre-field or infield validation of poles by human planners. The system may define the exclusion zones where the wireless network will not be planned. The system may generate possible links for the wireless network (e.g., mmWave network) using the detected poles as the nodes of the network. The system may leverage LiDAR data and building elevation data to identify viable lines of sights between nodes and determine Fresnel zones for the transmitters and receivers, which are difficult for human mappers to identify manually. The network solutions may include fiber network node locations and may have customizable maximum link distance.

In particular embodiments, the system may handle the polarity constraints and provide models for the throughput fall-off of links (e.g., per link distance), the site-specific cost per node (e.g., per pole or per building) and the time-division multiplexing of mmWave antennas. The system may generate a large number of network solutions (e.g., hundreds, thousands) in a short period of time (e.g., less than 20 minutes) to enable fast iteration of the planning process. The network nodes may be client nodes located on top of buildings such as apartments. The system may consider the seasonal foliage changes and generate solutions with network redundancy to tolerate single or multiple point failures of the network, and therefore improve the quality and reliability of the network.

In particular embodiments, the system may generate wireless communication network solutions utilizing the currently available spectrum and may also enable more spectrum to be available for connectivity. For example, the network solutions may be capable to utilize the spectrum in the mmWave frequency bands taking advantages of the flexible capacity and the capability of penetrating through cloud, rain, or fog as provided by the mmWave signals. The network solutions provide better connectivity where the fiber network is impracticable to be deployed. Furthermore, the availability of mmWave spectrum may be about three times than that of other technologies. The mmWave may have much larger amount of spectrum available at higher frequencies based on allocations and provide lager channel size at higher frequencies. The mmWave networks may provide wireless connections for homes and buildings, and provide wireless backhaul to Wi-Fi access points or cellular cells. The mmWave networks may extend fiber network wirelessly to avoid pulling fiber to every building and pole. The mmWave networks may deploy network at a scale that is impossible before. The mmWave networks may provide consumer-level pricing and may be custom-designed to be deployed by mobile operators. The mmWave networks may use a portion of mmWave bandwidth at 60 GHz, which is about 25 times higher than Wi-Fi frequencies.

In particular embodiments, the network solutions overcome a number of technical challenges that make the utilization of mmWave spectrum infeasible before. For example, the network solutions may optimize the wireless hardware types and locations to overcome the costs and challenges of deploying fiber. As another example, the network solutions may utilize street furniture (e.g., poles, buildings) to overcome the deployment challenge. As another example, the network solutions provide simplified and automated solutions to overcome the installation challenge. As another example, the network solutions are capable to utilize unlicensed bands to overcome the signal spectrum challenge.

Example Method

Figure 6:
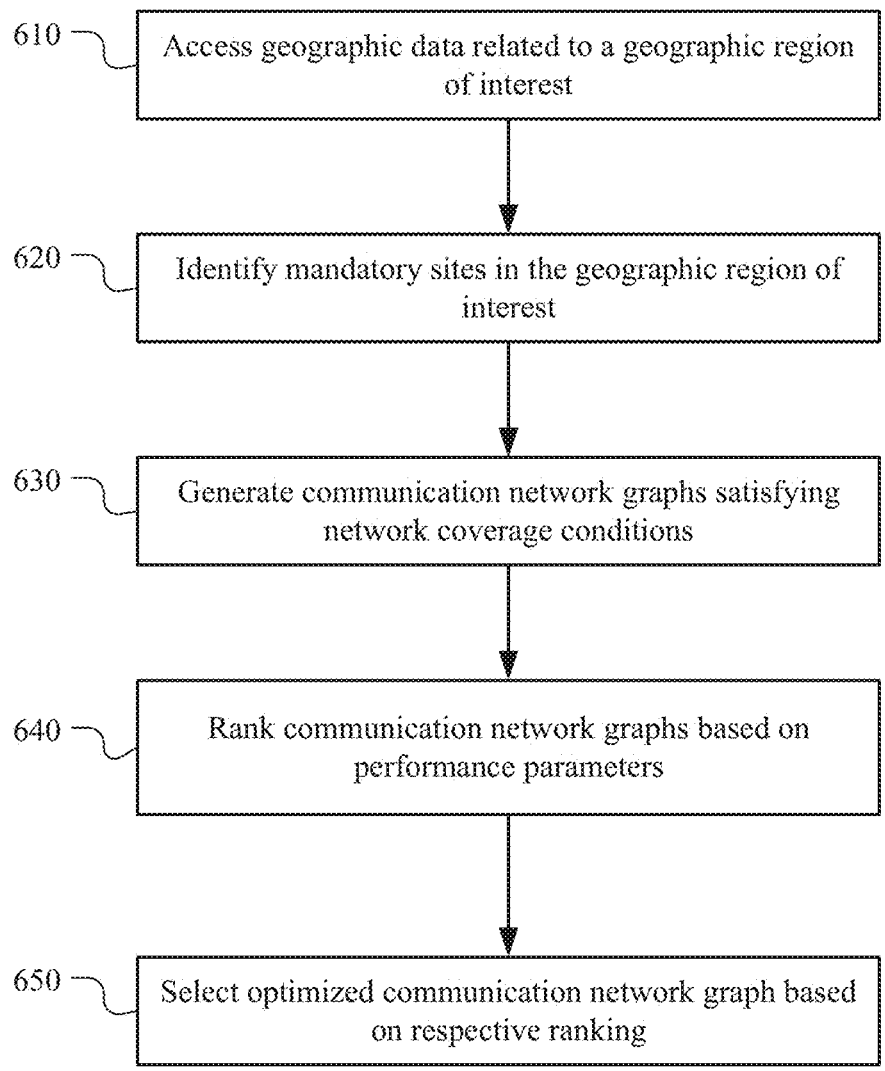
FIG. 6 illustrates an example method for generating and optimizing communication network graphs for a region of interest.

FIG. 6 illustrates an example method for generating and optimizing communication network graphs for a region of interest. The method may begin at step 610, where the system may access geographic data related to a region of interest from one or more data sources. In particular embodiments, the region of interest may be a geographic region of interest. In particular embodiments, the data sources may include, for example, but are not limited to, a geographic map repository, a satellite image repository, a road camera image repository, a vehicle camera image repository, a LiDAR data repository, an open-source data source, a data provider, etc.

At step 620, the system may identify multiple sites in the region of interest from the geographic data. For example, the sites may be identified from geographic maps or high-resolution satellite images using computer vision programs (e.g., machine-learning algorithms, artificial intelligence algorithms). The identified sites may include a number of mandatory sites which need to be reliably connected by network graph connections. The connections for the mandatory sites may have a reliability metric being above a pre-determined threshold metric. In particular embodiments, the system may further identify a number of optional sites. The identified sites may be a house, a building, a settlement, a town, a city, an area of interest, etc. In particular embodiments, the system may use computer vision algorithms to identify one or more houses in the region of interest and determine settlements based at least on spatial clustering of the identified houses in the region of interest. The system may identify a network type (e.g., fiber-optic networks, wireless broadband networks, cable networks, mmWave networks) that can profitably connect the identified settlements. In particular embodiments, the system may determine shapes of the identified settlements and determine circle area ratios of the settlements based on the determined shapes. Then, the system may determine an antenna arrangement for one or more wireless communication towers for the settlements based on their respective circle area ratios, shapes, and connectivity demands.

At step 630, the system may use an integer linear program to generate multiple communication network graphs for the region of interest. The communication network graphs may be generated based at least on the geographic data and a number of coverage conditions. The generated network graphs may maximize the network coverage under a given budget or may build a network that satisfies all the bandwidth requirements that minimize the total cost. The generated network graphs may include a number of nodes corresponding to the mandatory sites and a number of edges corresponding to communication network connections between the mandatory sites. Each communication network graph may satisfy one or more network coverage conditions. In particular embodiments, the network coverage conditions may include one or more of: a revenue metric associated with the communication network graphs being above a revenue threshold, a cost metric associated with the communication network graphs being below a cost threshold, a minimum service level being above a pre-determined threshold under one or more failure scenarios, or one or more constraints based on one or more rules for generating the plurality of communication network graphs.

In particular embodiments, the communication network graphs may be generated based on one or more existing infrastructures in the region of interest. The existing infrastructures may include, for example, but are not limited to, a pipeline, a power line, a bridge, a tunnel, a road, a building, a light pole, a cellar network tower, a sub-marine cable, an existing communication network, etc. In particular embodiments, the communication network graphs may be generated by aggregating the communication network connections and the locations of the mandatory sites into one or more geographic maps of the region of interest. In particular embodiments, the communication network graphs may connect the of mandatory sites in the region of interest using a combination of networks, for example, a fiber-optic network, a cable network, a wireless communication network, a mmWave network, etc.

At step 640, the system may rank the communication network graphs based on one or more performance parameters associated with the network coverage conditions. For example, the system may rank the communication network graphs based on one or more of: a covered population, a revenue metric, an overall cost metric, a cost metric per covered person a cost metric per incremental coverage, a reliability metric, a redundancy metric, a solution distance, a total available market (TAM) metric, or a serviceable available market (SAM) metric. At step 650, the system may select an optimized communication network graph for the region of interest from the multiple communication network graphs based on their respective rankings. In particular embodiments, the optimized communication network graph may be determined based on comparison of the generated communication network graphs. In particular embodiments, the optimized communication network graph may be determined using a Steiner tree optimization model. In particular embodiments, the system may calculate key performance indicators (KPIs) for the generated network solutions to compare/rank different network plans in terms of cost and different service-level metrics. The system may estimate a total cost of ownership (TCO) and the coverage (i.e., the total amount of bandwidth can be supported). The system may use the planning tool to accurately determine which backhaul solution is the most cost-efficient solution or to determine which backhaul solution provides the best coverage given a budget on TCO. The system may estimate additional KPIs such as number of antennas necessary to build the network, average link distance, MCS levels of links, most utilized/critical links and sites, and other metrics related to reliability, redundancy and availability of the network.

In particular embodiments, the system may generate value models for the mandatory sites in the region of interest. The system may determine, based at least on the value models, one or more first properties related to the mandatory sites in the region of interest, and one or more second properties related to the communication network connections. The system may determine the network coverage conditions for the integer linear program based at least on the first properties related to the mandatory sites and the second properties related to the communication network connections. The first properties related to the mandatory sites may include, for example, but are not limited to: a population, a population density, a penetration rate, a data consumption metric, a predicted data consumption metric, an estimated revenue, an average revenue per user (ARPU), a shape, a terrain, a terrain roughness, an elevation, an area size, a dimensional metric, a land cover type, a distance to another region, a travel time to major cities, a travel time to existing coverages, a geographic property, a coverage of an existing infrastructure, etc. The second properties related to the communication network connections for the mandatory sites may include, for example, but are not limited to: a length, a cost metric, a construction type, a related terrain, a related existing infrastructure, a capacity, a reliability metric, a redundancy metric, etc.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for generating and optimizing communication network graphs for a region of interest including the particular steps of the method of FIG. 6, this disclosure contemplates any suitable method for generating and optimizing communication network graphs for a region of interest including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Systems and Methods

Figure 7:
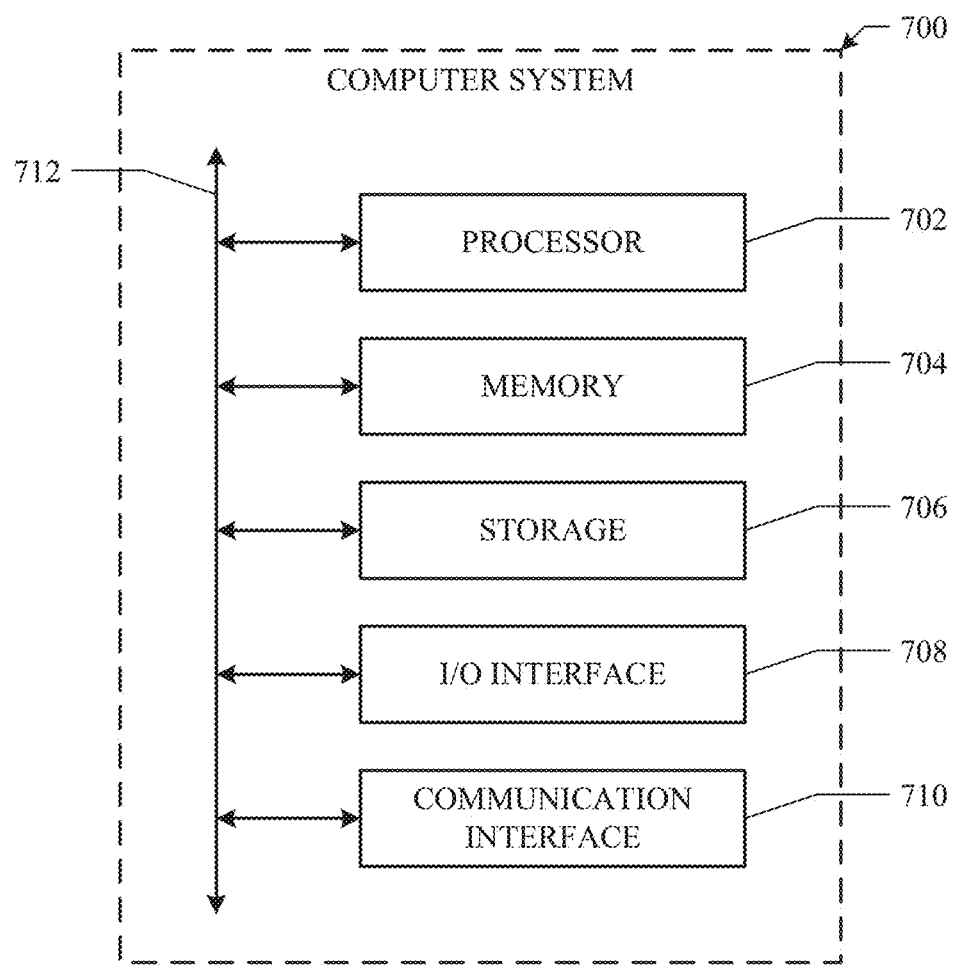
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
   accessing from one or more data sources, geographic data related to a geographic region of interest;
   identifying, in the geographic region, a plurality of sites satisfying one or more criteria based at least on the geographic data accessed from the one or more data sources;
   generating, by an approximation program, for the geographic region, a plurality of communication network graphs each satisfying one or more network coverage conditions, wherein each communication network graph comprises a plurality of nodes corresponding to the plurality of sites satisfying the one or more criteria and a plurality of edges corresponding to communication network connections between the plurality of sites satisfying the one or more criteria;
   ranking the plurality of communication network graphs based on one or more performance parameters; and selecting an optimized communication network graph for the geographic region from the plurality of communication network graphs based on their respective rankings.

2. The method of claim 1, wherein a communication network is deployed for the geographic region based on the selected optimization communication network graph.

3. The method of claim 1, wherein the approximation program comprises an integer linear program.

4. The method of claim 3, further comprising:
determining, based at least on the geographic data, one or more first properties associated with the plurality of sites in the geographic region;
determining, based at least on the geographic data, one or more second properties associated with the communication network connections between the plurality of sites in the geographic region; and
determining the one or more network coverage conditions for the integer linear program based at least on the one or more first properties associated with the plurality of sites and the one or more second properties associated with the communication network connections.

5. The method of claim 1, further comprising:
sensing, by one or more sensors, the geographic data related to the geographic region of interest.

6. The method of claim 1, wherein the plurality of sites satisfying the one or more criteria are mandatory sites in the geographic region that need to be connected with a minimum connectivity service level under a plurality of network failure scenarios.

7. The method of claim 6, wherein the one or more network coverage conditions comprise one or more of:
a minimum connectivity service level for the plurality of sites being above a pre-determined threshold under the plurality of network failure scenarios;
a redundancy metric associated with the communication network connection between the plurality of sites being above a redundancy threshold;
a reliability metric associated with the communication network connections between the plurality of sites being above a reliability threshold;
a cost metric associated with the plurality of communication network graphs being below a cost threshold;
a revenue metric associated with the plurality of communication network graphs being above a revenue threshold; or
one or more constraints based on one or more rules for generating the plurality of communication network graphs.

8. A method comprising, by a computing system:
accessing from one or more data sources, geographic data related to a geographic region of interest;
identifying, in the geographic region, a plurality of sites satisfying one or more criteria based at least on the geographic data accessed from the one or more data sources;
generating, by a heuristic optimization program, for the geographic region, a plurality of communication network graphs each satisfying one or more network coverage conditions, wherein each communication network graph comprises a plurality of nodes corresponding to the plurality of sites satisfying the one or more criteria and a plurality of edges corresponding to communication network connections between the plurality of sites satisfying the one or more criteria;
ranking the plurality of communication network graphs based on one or more performance parameters; and
selecting an optimized communication network graph for the geographic region from the plurality of communication network graphs based on their respective rankings.

9. The method of claim 8, further comprising:
sensing, by one or more sensors, the geographic data related to a geographic region of interest.

10. The method of claim 8, wherein a communication network is deployed for the geographic region based on the selected optimization communication network graph.

11. The method of claim 8, further comprising:
determining, based at least on the geographic data, one or more first properties associated with the plurality of sites in the geographic region;
determining, based at least on the geographic data, one or more second properties associated with the communication network connections between the plurality of sites in the geographic region; and
determining the one or more network coverage conditions for the heuristic optimization program based at least on the one or more first properties associated with the plurality of sites and the one or more second properties associated with the communication network connections.

12. The method of claim 8, wherein the plurality of sites satisfying the one or more criteria are mandatory sites in the geographic region that need to be connected with a minimum connectivity service level under a plurality of network failure scenarios.

13. The method of claim 12, wherein the one or more network coverage conditions comprise one or more of:
a minimum connectivity service level for the plurality of sites being above a pre-determined threshold under the plurality of network failure scenarios;
a redundancy metric associated with the communication network connection between the plurality of sites being above a redundancy threshold;
a reliability metric associated with the communication network connections between the plurality of sites being above a reliability threshold;
a cost metric associated with the plurality of communication network graphs being below a cost threshold;
a revenue metric associated with the plurality of communication network graphs being above a revenue threshold; or
one or more constraints based on one or more rules for generating the plurality of communication network graphs.

14. A system comprising:
one or more sensors operative to sense geographic data related to a geographic region of interest;
one or more non-transitory computer-readable storage media embodying instructions;
one or more processors coupled to the storage media and operable to execute the instructions to:
identify, in a geographic region, a plurality of sites satisfying one or more criteria based at least on geographic data accessed from one or more data sources;
generate, for the geographic region, a plurality of communication network graphs each satisfying one or more network coverage conditions, wherein each communication network graph comprises a plurality of nodes corresponding to the plurality of sites and a plurality of edges corresponding to communication network connections between the plurality of sites;
rank the plurality of communication network graphs based on one or more performance parameters; and select an optimized communication network graph for the geographic region from the plurality of communication network graphs based on their respective rankings.

15. The system of claim 14, wherein the plurality of communication network graphs are generated by an approximation program.

16. The system of claim 14, wherein a communication network is deployed for the geographic region based on the selected optimization communication network graph.

17. The system of claim 14, wherein the approximation program comprises an integer linear program.

18. The system of claim 17, wherein the one or more processors coupled to the storage media and further operate execute the instructions to:
- determine, based at least on the geographic data, one or more first properties associated with the plurality of sites in the geographic region;
- determine, based at least on the geographic data, one or more second properties associated with the communication network connections between the plurality of sites in the geographic region; and
- determine the one or more network coverage conditions for the integer linear program based at least on the one or more first properties associated with the plurality of sites and the one or more second properties associated with the communication network connections.

19. The system of claim 14, wherein the plurality of sites satisfying the one or more criteria are mandatory sites in the geographic region that need to be connected with a minimum connectivity service level under a plurality of network failure scenarios.

* * * * *